United States Patent
Park et al.

(10) Patent No.: US 8,192,842 B2
(45) Date of Patent: Jun. 5, 2012

(54) PROCESS FOR PREPARING POLYURETHANE PARTICULATE AND POLYURETHANE PARTICULATE PREPARED THEREFROM

(75) Inventors: Chang Won Park, Yongin-shi (KR); Young Seo Yoon, Seoul (KR)

(73) Assignee: Kolon Industries, Inc., Kwacheon (KR)

( * ) Notice: Subject to any disclaimer, the term of this patent is extended or adjusted under 35 U.S.C. 154(b) by 412 days.

(21) Appl. No.: 12/440,972

(22) PCT Filed: Sep. 13, 2007

(86) PCT No.: PCT/KR2007/004420
§ 371 (c)(1),
(2), (4) Date: Mar. 12, 2009

(87) PCT Pub. No.: WO2008/032988
PCT Pub. Date: Mar. 20, 2008

(65) Prior Publication Data
US 2010/0062254 A1     Mar. 11, 2010

(30) Foreign Application Priority Data

Sep. 13, 2006 (KR) .................. 10-2006-0088400
Jan. 8, 2007 (KR) .................. 10-2007-0001880
Sep. 13, 2007 (KR) .................. 10-2007-0092921

(51) Int. Cl.
*C08G 71/04* (2006.01)

(52) U.S. Cl. .................. 428/402; 528/367; 528/288
(58) Field of Classification Search .................. None
See application file for complete search history.

(56) References Cited

U.S. PATENT DOCUMENTS

| 3,560,447 | A | * | 2/1971 | Bingham .................. 428/402 |
| 4,069,291 | A |   | 1/1978 | Kidoh et al. |
| 4,833,177 | A | * | 5/1989 | Faler et al. .................. 523/221 |
| 6,429,255 | B1 |  | 8/2002 | Miskovic et al. |

FOREIGN PATENT DOCUMENTS

| JP | 09-183858 | 7/1997 |
| KR | 1020060018596 A | 3/2006 |
| KR | 1020060029697 A | 4/2006 |
| KR | 1020060033035 A | 4/2006 |

* cited by examiner

Primary Examiner — Randy Gulakowski
Assistant Examiner — Jeffrey Washville
(74) Attorney, Agent, or Firm — Sughrue Mion, PLLC

(57) ABSTRACT

Disclosed is a process for preparing polyurethane particulate and polyurethane particulate prepared therefrom. The polyurethane particulate has properties such that it is easy to control to a spherical form, the polyurethane particulate can be prepared in a desired particle size, the color thereof is stably exhibited, a washing process thereof is easy because almost no foam is generated in the washing process, and the preparation cost can be lowered because the particles do not lump and a separate grinding process is not needed, by using an inorganic suspension stabilizer in the manufacture process of the polyurethane particulate.

10 Claims, 3 Drawing Sheets

PROCESS FOR PREPARING POLYURETHANE PARTICULATE AND POLYURETHANE PARTICULATE PREPARED THEREFROM

This is a national stage application under 35 U.S.C. §371 of PCT/KR2007/004420 filed on Sep. 13, 2007, which claims priority from Korean patent application 10-2006-0088400 filed on Sep. 13, 2006, from Korean patent application 10-2007-00018800 filed on Jan. 8, 2007, and from Korean patent application 10-2007-0092921 filed Sep. 13, 2007, all of which are incorporated herein by reference.

BACKGROUND OF THE INVENTION (a) Field of the Invention

The present invention relates to a process for preparing polyurethane particulate and polyurethane particulate prepared therefrom, and more particularly to a process for preparing polyurethane particulate and spherical polyurethane particulate prepared therefrom that is capable of having thermoplastic and thermosetting properties, having uniform and regular form, and that is economical due to a simple manufacture process by using an inorganic stabilizer as a suspension stabilizer in the manufacture process of the polyurethane particulate.

(b) Description of the Related Art

The polyurethane particulate has been used as an additive for paints, as an additive for print-ink, as a resin modifying agent, for cosmetics, for an interior material or bumper material for automobile use, and the like.

In order to prepare the polyurethane particulate, the related art has used a method for mechanically grinding polyurethane in a solid state at a low temperature, and a method for extracting and drying polyurethane from a water-dispersion in which polyurethane is dispersed in water.

U.S. Pat. No. 3,787,525 discloses the method for preparing polyurethane particulate by using an inert solvent with polyurethane prepared through solution-polymerization.

Japan Patent Application Publication 2004-107476 discloses a method for preparing polyurethane beads by dispersing an isocyanate prepolymer in water using an organic suspension stabilizer such as a cellulose aqueous resin, a polyvinyl alcohol, polyvinyl pyrrolidone, and the like, and heating them.

Japan Patent Application Publication 1999-116649 discloses a method for preparing spherical particles by contacting a dispersion media and a polyurethane prepolymer solution by a rigid porous film having a uniform pore diameter, extruding by adding pressure into the dispersion media state, and curing the resultant, so as to prepare monodisperse polyurethane beads.

However, the polyurethane particles obtained by the method of the related art tends to result in amorphous form rather than spherical form. Also, it has problems that particles with desired-size cannot be formed, the manufacturing cost is high, and the process is complicated.

Also, the organic suspension stabilizer used in the particle preparation can result in impurities, and thus a washing process needs to be performed in the preparation procedure. Furthermore, when the organic suspension stabilizer is used, the washing condition is complicated and the pigment and the stabilizer can be removed during the washing process.

SUMMARY OF THE INVENTION

Thus, in order to resolve the above problems of the related arts, in a process for preparing a polyurethane particulate using a compound having at least one isocyanate group and a compound having at least one active hydrogen in the presence of a suspension stabilizer, the present invention is perfected by confirming that almost no foam is generated in a washing process by using an inorganic metal compound as the suspension stabilizer compared with an organic suspension stabilizer, and each of a thermoplastic and a thermosetting polyurethane particulate having superior properties can be prepared according to the number of functional groups of the compound having at least one isocyanate group and the compound having at least one active hydrogen.

Therefore, it is an object of the present invention to provide a process for preparing a polyurethane particulate that is easy to wash, in which it is easy to control particle size and form, and in which a uniform and regular size distribution of a desired particulate size can be obtained.

Another object of the present invention is to provide a polyurethane particulate that is able to be used with special quality of the thermoplastic and thermosetting polyurethane, and that stably exhibits a color.

DETAILED DESCRIPTION OF THE EMBODIMENTS

Figure 1:
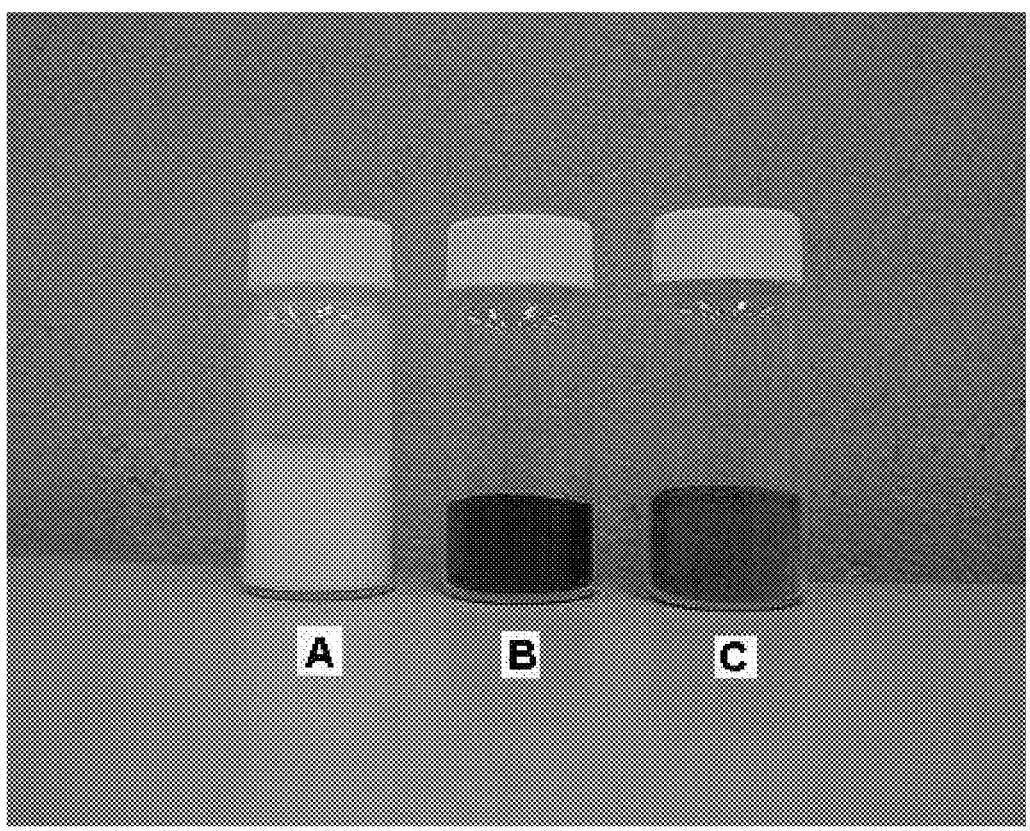
FIG. 1 shows a photograph of contrasting samples, in order to confirm a color stability property according to the method of the present invention, wherein A is uncolored particles, B is colored particles of Example 13 of the present invention, and C is decolored particles of Comparative Example 6.

In order to achieve the above objects, the present invention provides the process for preparing a polyurethane particulate including the steps of dispersing a compound having at least one isocyanate group and a compound having at least one active hydrogen in a dispersion medium including an inorganic suspension stabilizer to prepare a suspension solution, and reacting the suspension solution.

The inorganic suspension stabilizer is characterized by using 0.5 to 20 parts by weight, based on 100 parts by weight of the total composition of the compound having at least one isocyanate group and the compound having at least one active hydrogen.

The present invention also provides a polyurethane particulate having an average particle size of 1~100 μm and having shore hardness A of 70 to 75.

The polyurethane particulate may have a melting point of 200 to 230° C. and a melting index of 60 or more at 160° C.

An exemplary embodiment of the present invention will now be described in more detail.

The present invention relates to a polyurethane particulate having a uniform micron size without lumping of the particles, and a preparation method thereof by using an inorganic suspension stabilizer in the manufacturing process of polyurethane particulate using a polyisocyanate prepolymer.

In the present invention, the polyurethane particulate includes polyurethane beads.

In order to prepare the polyurethane particulate, the present invention can obtain the polyurethane particulate by including the steps of adding the compound having at least one isocyanate group and the compound having at least one active hydrogen to the solvent in which the inorganic suspension stabilizer is dispersed, preparing the suspension solution through stirring and dispersion, progressing a heating-reaction of the suspension solution, and performing solid-liquid separation, washing, and drying of the resultant.

The present invention can prevent the separation of a pigment together with the stabilizer in the washing process by using the inorganic suspension stabilizer, and thus the form of the particulate does not becomes an amorphous indeterminate form and the desired color can be stably shown. For example, the inorganic suspension stabilizer may be an inorganic metal compound of one or more selected from the group consisting of barium sulfate, calcium sulfate, barium carbonate, magnesium carbonate, silica, aluminum trioxide, aluminum hydroxide, tricalcium phosphate, magnesium hydroxide, titanium oxide, and calcium carbonate.

It is preferable that the inorganic suspension stabilizer is used at 0.5 to 20 parts by weight, based on 100 parts by weight of total composition of the compound having at least one isocyanate group and the compound having at least one active hydrogen. If the amount is below 0.5 parts by weight, an emulsifying property of a raw material is insufficient, and the cohesion phenomenon can occur in the synthesis process. In addition, if it exceeds 20 parts by weight, a problem in the stirring process due to a viscosity increase may occur. Further, it is difficult to separate the particles because the particle size becomes too small, and it does not maintain the effects according to an increase in quantity of the inorganic stabilizer.

The compound having at least one isocyanate group used in the present invention may be at least one selected from the group consisting of an aromatic, an aliphatic, and a cycloaliphatic isocyanate compound, but is not limited thereto. For example, the compound having at least one isocyanate group may be selected from the group consisting of di-functional isocyanate compounds of trilene diisocyanate, 4,4'-diphenyl methane diisocyanate, xylene diisocyanate, methaxylene diisocyanate, 1,6-hexamethylene diisocyanate, and isophorone diisocyanate; a polyisocyanate of a tri-functional group or more; and mixtures thereof, and can be used alone or as a mixture of 2 or more thereof. In addition, it can use any one of a yellowing type, a non-yellowing type, or an yellowing-resistant type. However, it is preferable to use the non-yellowing type, in order to use for paints, ink, and the like.

The compound having at least one active hydrogen may be any one capable of reacting with the isocyanate group, and there is no limit to the kinds. For example, the compound having at least one active hydrogen may be one or more selected from the group consisting of a polyester-based polyol, a polyether-based polyol, and an acrylic polyol. In one embodiment, the compound may be used alone or as a mixture of 2 or more selected from the group consisting of ethylene glycol, propylene glycol, 1,4-butane diol, 1,5-pentane diol, 1,6-hexane diol, octane diol, neopentyl glycol, ethylene diamine, polypropylene glycol, polyethylene glycol, poly-$\epsilon$-caprolactone, and polyhexamethylene carbonate.

In addition, the present invention can prepare the thermoplastic polyurethane beads and the themosetting polyurethane beads by controlling the functional group of the compound having at least one isocyanate group and the compound having at least one active hydrogen.

That is, when the functional group of both the compound having at least one isocyanate group and the compound having at least one active hydrogen are di-functional, the present invention can be used to prepare the thermoplastic polyurethane particulate (beads) so as to impart the feel of a material having high quality, a soft feeling, and a scratch-resistance property in a resin such as ABS or PP used in the interior of an automobile. Also, if at least one of the compounds is a tri-functional group or more, the polyurethane particulate (beads) has a three-dimensional crosslinked network structure and a themosetting property. Thus, the present invention can be used to increase the scratch-resistance property of a coated surface, and can result in elastic strength for use as an additive of paints, ink, and so on due to a superior solvent-resistance property to the organic solvent.

Furthermore, if the isocyanate monomer is used in the present invention, a needless reaction is caused between an NCO group of the terminal and water because the content of the NCO group of an isocyanate-terminal group in the suspension solution state is increased. Thus, a carbonic acid gas is generated and the carbonic acid gas may cause a gap. Therefore, it is preferable that the compound having at least one isocyanate group is a compound having a molecular weight of 1000 or more, and more particularly a molecular weight of 1000 to 3000.

In addition, the dispersion solvent to disperse the suspension stabilizer in the present invention is preferably water rather than an organic solvent. The water is eco-friendly, has a low cost, and does not dissolve the components of the urethane compound. However, the present invention may use the organic solvent as a diluent in order to control the viscosity of the urethane compound as occasion demands. The organic solvent that is capable of being used in the present invention may be an aromatic or aliphatic hydrocarbon, an ester-based compound, an ether-based compound, an alcohol compound, a ketone-based compound, and the like.

The dispersion machine is needed so that the compound having at least one isocyanate group and the compound having at least one active hydrogen is dispersed in the solvent by using the suspension stabilizer. The dispersion machine is not limited in the present invention. For example, it can be an ultrasonic dispersion machine, a homogenizer, a ball-mill, a sand-grind mill, a high-speed mixer, and the like.

The reaction temperature in the present invention is not particularly limited, but it is preferably 40~90° C. In addition, in the present invention, the reactant is stirred and dispersed for 30 minutes or more at a speed of 600 rpm or more, in order to control the particle size. Thereafter, the product separates into solid and liquid states, and the polyurethane particulate is obtained by removing the suspension stabilizer through washing, followed by drying the resultant.

Also, the kinds, amounts, and ratio of the compound having at least one isocyanate group and the compound having at least one active hydrogen in the present invention can be changed according to the use of the polyurethane particulate. In some embodiments, the mixture weight ratio of the compound having at least one isocyanate group and the compound having at least one active hydrogen may be 1:9 to 9:1.

The present invention further uses pigments to exhibit desired colors according to the uses of the polyurethane particulate. The pigments are not limited so long as they do not obstruct the reaction of the present invention. For examples, they may be barium sulfate having a precipitation property, gypsum, an alumina, clay, silica, a talc, calcium silicate, magnesium carbonate having a precipitation property, carbon black, and the like. Although the washing procedure is used, the pigment is not separated in the present invention using the inorganic suspension stabilizer. Thus, the present invention can stably exhibit the desired color of the polyurethane particulate.

One the other hand, when the compound having at least one active hydrogen reacting with the compound having at least one isocyanate group has soft feeling, the prepared polyurethane particulate can be lumped, and thus it can be difficult to obtain the powder state. In this case, if the molecular weight is increased by using the chain transfer agent, the polyurethane particulate can be obtained in the powder state because the glass transition temperature of the polyurethane is raised. The chain transfer agent may be at least one selected from the group consisting of a glycol series having a low molecular weight such as ethylene glycol, propylene glycol, 1,3-butane diol, 1,4-butane diol, 1,6-hexane diol, and trimethylol propane; and an amine series such as ethylene diamine, propylene diamine, hexamethylene diamine, and diethanol amine.

Also, the present invention may further use additives of a plasticizer, a stabilizer, an antioxidant, an ultraviolet absorber, and so on, as occasion demands. Any additive that does not obstruct the reaction of the present invention is able to be used and is suited for the use of polyurethane.

Through the method, the present invention can obtain a polyurethane particulate having an average particle size of 1~100 μm. Preferably, the present invention can obtain polyurethane beads having a uniform spherical form with an average particle size of 4 to 15 μm.

Although the washing procedure of the suspension stabilizer is used for the polyurethane particulate of the present invention, the spherical form of the particulate is stably maintained and it has the solvent-resistant property for the organic solvent and stably exhibits the color of the pigment because the particle interior has the three-dimensional network structure, as well as being of a uniform and regular form.

Furthermore, the polyurethane particulate of the present invention satisfies the shore hardness of 70 to 75, and thus the scratch-resistance property is superior. If the shore hardness A is below the range, the scratch-resistance property is deteriorated. If it exceeds the range, the feeling of a resultant material is deteriorated. In addition, since the thermoplastic polyurethane particulate of the present invention has a melting point of 200 to 230° C. and a melting index of 60 or more at 160° C., the particulate is able to be melted completely and the molding is advantageous. If the melting point is below the range, the application is unsuitable because a component including the polyurethane particulate is able to melt or degenerate at a temperature in which it is used, for example in the temperature range experienced by an automobile and the like. Also, if it exceeds the range, a component to which the polyurethane particulate is applied is affected by a molding process thereof, and thus it is also unsuitable. In addition, if the melting index is below the range, application thereof is difficult because its flowing property decreases and it is difficult to perform uniform molding.

Thus, the polyurethane beads of the present invention are useful as thermoplastic polyurethane beads that are capable of imparting a feeling of a material having high quality and a soft feeling, and the scratch-resistance property for a resin such as ABS or PP used in the interior material of automobile. Simultaneously, it has a superior solvent-resistance property, and thus it is useful as thermosetting polyurethane beads that raise the scratch-resistance property of a coated surface and imparts elastic power when used as an additive of paints, ink, and the like.

As mentioned, since almost no foam is generated in the washing process after the preparation of the polyurethane particulate by using at least one selected from the group consisting of the above inorganic metal compounds as the suspension stabilizer, the washing is easy and the polyurethane particulate can be easily obtained in the drying process. When the organic suspension stabilizer of the related art is used, the foam generation in the washing process is extreme due to a high molecular weight thereof, and a separate grinding process must be performed when obtaining beads of a solid state. However, the present invention has a simple process and advantageous in cost condition, compared to the related art.

In addition, the preparation method of the polyurethane particulate is economical because the control of the spherical form with desired particle size is easy and the preparation process is also simple without needing an additional process such as a grinding process, so the preparation cost can be lowered.

The present invention is described in further detail with reference to the preferred examples. However, the following examples are only for the understanding of the present invention and they do not limit the present invention.

Example 1

10 g of Calcium carbonate as a suspension stabilizer was dissolved in 1000 g of ion-exchange water as a dispersion medium.

70 g of caprolactone diol having dihydroxy groups and having a molecular weight of 2000 and 100 g of non-yellowing isophorone diisocyanate having diisocyanate groups were added to the mixture, and the suspension was prepared by stirring for 30 minutes at 600 rpm. The prepared suspension was added to a 3 l flask and the temperature was raised to 70° C., and the resultant was reacted for 6 hrs at 250 rpm and then cooled. The reaction solution was separated into solid and liquid states with a centrifuge and the resultant was sufficiently washed with water and dried, thereby obtaining spherical polyurethane beads having an average particle size of 9.5 μm.

The polyurethane beads had a thermoplastic property, and when the dispersion agent was washed, a white powder could be easily obtained through the drying process because the washing was easily performed.

Example 2

Polyurethane beads were prepared by the same method as in Example 1, except for using 70 g of caprolactone triol having trihydroxy groups and having a molecular weight of 700. The finally prepared spherical polyurethane beads had a thermosetting property and an average particle size of 9.8 μm.

cl Example 3

Thermosetting and spherical polyurethane beads having an average particle size of 10.4 μm were prepared by the same method as in Example 1, except for using 70 g of caprolactone diol having dihydroxy groups and having a molecular weight of 2000 and 100 g of non-yellowing polyisocyanate having tri-isocyanate groups (AEKYUNG CHEMICAL: DN-980S).

Example 4

Thermosetting and spherical polyurethane beads having an average particle size of 10.8 μm were prepared by the same method as in Example 1, except for using 70 g of caprolactone triol having trihydroxy groups and having a molecular weight of 700 and 100 g of non-yellowing polyisocyanate having tri-isocyanate groups (AEKYUNG CHEMICAL: DN-980S).

Comparative Example 1

Polyurethane beads having an average particle size of 7.4 μm were prepared by the same method as in Example 1, except for using 30 g of polyvinyl alcohol as the suspension stabilizer. The polyurethane beads were not washed of the stabilizer well due to the large molecular weight of the aqueous polyvinyl alcohol in the washing process. Thus, when the solid state beads were obtained, the particles were lumped to each other and a separate grinding process had been needed.

Comparative Example 2

Polyurethane beads having an average particle size of 8.3 μm were prepared by the same method as in Example 1, except for using 30 g of methyl cellulose as the suspension stabilizer. The polyurethane beads were not washed of the stabilizer well due to the large molecular weight of the methyl cellulose in the washing process. Thus, when the solid state beads were obtained, the particles were lumped to each other and a separate grinding process had been needed.

Examples 5 TO 9

Polyurethane beads were was prepared by the same method as in Example 1, except for adding components at amounts shown in the following Table 1 as the inorganic suspension stabilizer to 1000 g of ion-exchange water.

TABLE 1

|  | Suspension stabilizer | Amount (g) | Average particle size (μm) |
|---|---|---|---|
| Example 5 | Barium sulfate | 10 | 9.7 |
| Example 6 | Magnesium carbonate | 10 | 9.4 |
| Example 7 | Aluminum trioxide | 10 | 8.7 |
| Example 8 | Titanium oxide | 10 | 9.2 |
| Example 9 | Magnesium hydroxide | 10 | 10.8 |

Examples 10 TO 12 AND COMPARATIVE EXAMPLE 3

Polyurethane beads were prepared by the same method as in Example 1, except for adding calcium carbonate at the amounts shown in the following Table 2 as the inorganic suspension stabilizer to 1000 g of ion-exchange water.

TABLE 2

|  | Ion-exchange water (g) | Calcium Carbonate (g) | Average particle size (μm) |
|---|---|---|---|
| Example 10 | 1000 | 5 | 13.2 |
| Example 11 | 1000 | 20 | 6.7 |
| Example 12 | 1000 | 30 | 4.8 |
| Comparative Example 3 | 1000 | 50 | 4.5 |

As shown in Table 2, when the amount of inorganic suspension stabilizer is in the range of the present invention, the polyurethane particulate of a spherical form having a particle size of 4 to 15 μm was prepared. However, if its amount is excessive, there is no specific effect improvement according to the amount addition. Thus, it can be known that the content of inorganic suspension stabilizer is preferably used in the range of the present invention from an economic point of view.

Example 13

10 g of tricalcium phosphate as a suspension stabilizer was dissolved in 1000 g of ion-exchange water to prepare a dispersion medium.

70 g of caprolactone diol having dihydroxy groups, 100 g of non-yellowing isophorone diisocyanate having diisocyanate groups and having a molecular weight of 2000, and 14 g of Fastogen Blue FGF (DAINIPPON INK AND CHEMICALS, INCORPORATED) as a pigment were added to the mixture, and the suspension was prepared by stirring for 30 minutes at 600 rpm. The prepared suspension was added to a 3 l flask and the temperature was raised to 70° C., and the resultant was reacted for 6 hrs and then cooled. The reaction solution was separated into solid and liquid states with a centrifuge and the resultant was sufficiently washed with water and dried, obtaining thermoplastic colored polyurethane beads having an average particle size of 9.3 μm.

Example 14

Thermosetting and spherical polyurethane beads having an average particle size of 9.7 μm were prepared by the same method as in Example 13, except for using 70 g of caprolactone triol having trihydroxy groups and having a molecular weight of 700 instead of the caprolactone diol.

Example 15

Thermosetting and spherical polyurethane beads having an average particle size of 10.2 μm were prepared by the same method as in Example 13, except for using 100 g of non-yellowing polyisocyanate having tri-isocyanate groups (AEKYUNG CHEMICAL: DN-980S).

Example 16

Thermosetting and spherical polyurethane beads having an average particle size of 10.8 μm were prepared by the same method as in Example 14, except for using 100 g of non-yellowing polyisocyanate having tri-isocyanate groups (AEKYUNG CHEMICAL: DN-980S).

Example 17

Thermosetting and spherical polyurethane beads having an average particle size of 9.2 μm were prepared by the same method as in Example 13, except for using carbon black as the pigment.

Example 18

Thermosetting and spherical polyurethane beads having an average particle size of 13.4 μm were prepared by the same method as in Example 13, except for using 5 g of tricalcium phosphate.

Example 19

Thermosetting and spherical polyurethane beads having an average particle size of 6.8 μm were prepared by the same method as in Example 13, except for using 20 g of tricalcium phosphate.

Example 20

Thermosetting and spherical polyurethane beads having an average particle size of 5.1 µm were prepared by the same method as in Example 13, except for using 30 g of tricalcium phosphate.

Comparative Example 4

Polyurethane particulate was obtained by the same method as in Example 13, except for using 30 g of polyvinyl alcohol as the suspension stabilizer. After the washing and drying processes, the particulate was obtained through a grinding process because the particles were amorphous and were lumped to each other. The average particle size of the particulate by grinding process was 7.8 µm.

Comparative Example 5

Polyurethane particulate was obtained by the same method as in Comparative Example 4, except for using 30 g of methyl cellulose as the suspension stabilizer. The average particle size of the particulate was 8.6 µm. Likewise in the Comparative Example 4, the particulate was also obtained by a grinding process because the particles were partly lumped.

Comparative Example 6

Polyurethane particulate was obtained by the same method as in Comparative Example 4, except for further adding 1000 g of calcium hydroxide as a 10% aqueous solution. After the washing and drying processes, the pigment was decolored. The average particle size of particulate obtained by grinding process was 9.3 µm.

Comparative Example 7

The polyurethane particulate was obtained by the same as Comparative Example 5, except for further adding 1000 g of calcium hydroxide as a 10% aqueous solution in Comparative Example 5. After the washing and drying processes, the pigment was decolored. The average particle size of the particulate obtained by a grinding process was 8.6 µm.

Results are illustrated in FIG. 1 of a photograph of a coloring degree of the particulates obtained by Example 13 and Comparative Example 6, in order to confirm experimental results more easily.

In FIG. 1, A is polyurethane particulate of an uncolored state, B is a polyurethane particulate according to Example 13, and C is polyurethane particulate of Comparative Example 6. As shown in the results, according to the process of the present invention, it can be known that the pigment was not removed and the color was stably exhibited. However, Comparative Example 6 shows decoloration because the pigment was removed in the washing process.

Figure 2:
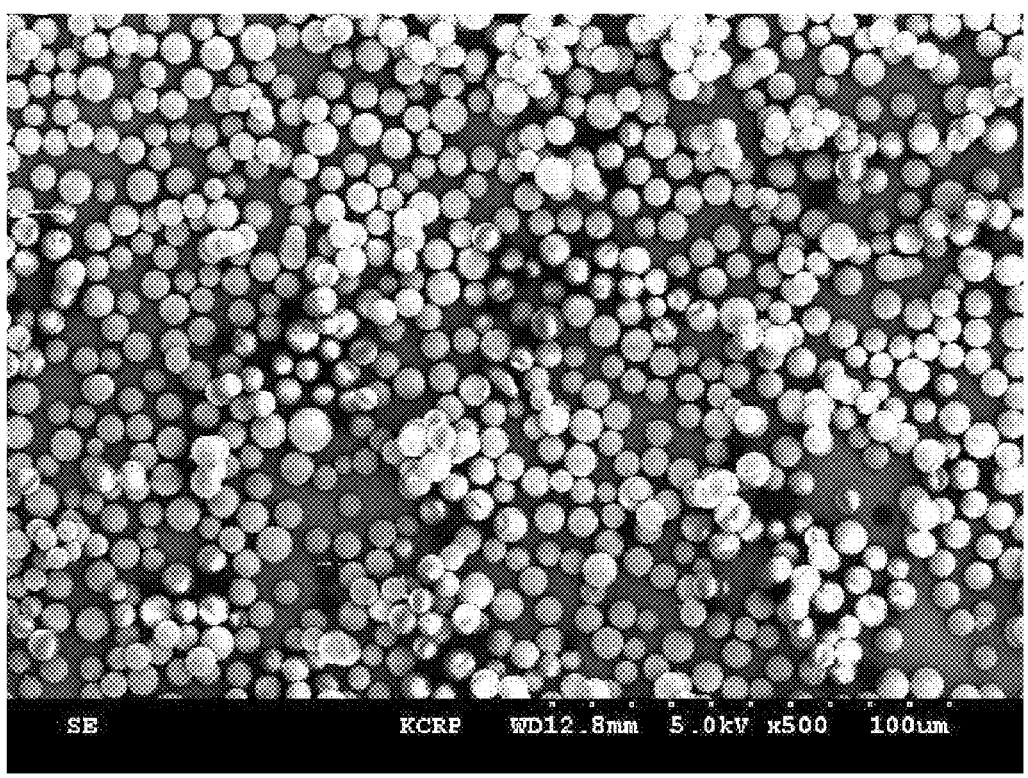
FIG. 2 shows a SEM (scanning electron microscope) photograph of the polyurethane particulate according to Example 8 of the present invention.
Figure 3:
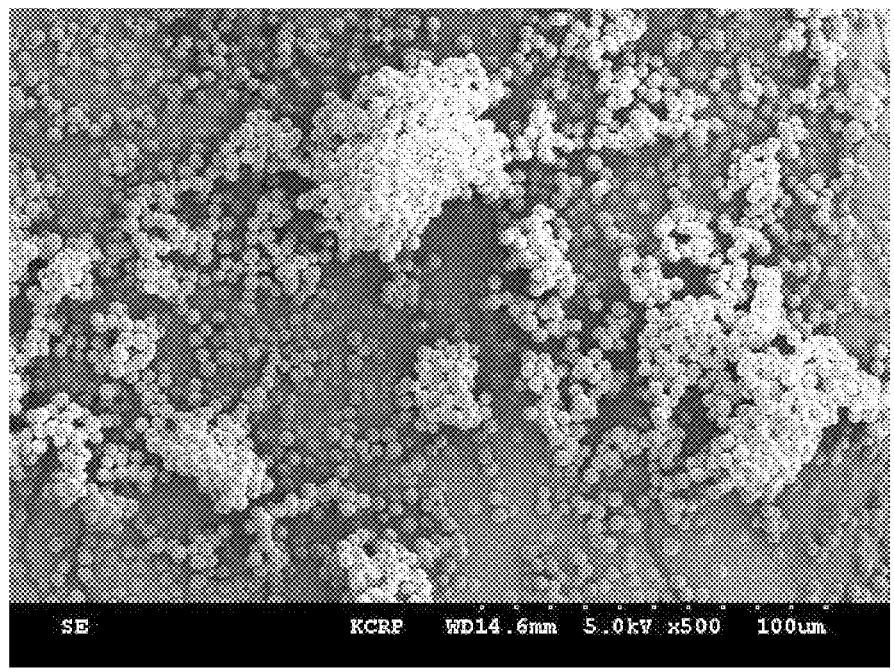
FIG. 3 shows a SEM (scanning electron microscope) photograph of the polyurethane particulate according to Comparative Example 4.
Figure 4:
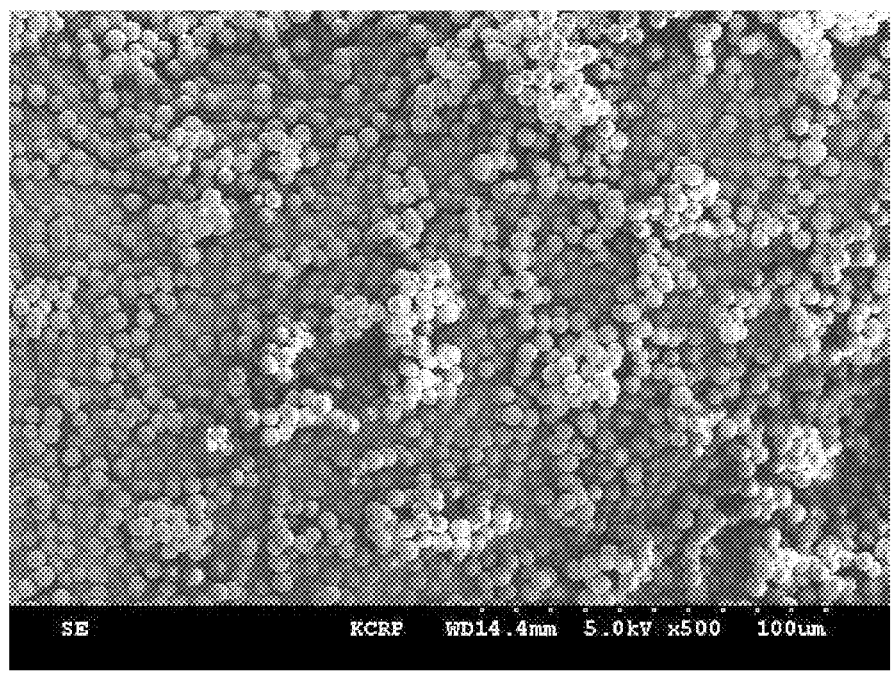
FIG. 4 shows a SEM (scanning electron microscope) photograph of the polyurethane particulate according to Comparative Example 5.

The FIGS. 2 to 4 by observing particles with an SEM (scanning electron microscope) were shown, in order to confirm the form and lumping generation of the particles obtained by Example 8 and Comparative Examples 4 and 5.

FIG. 2 shows an SEM (scanning electron microscope) photograph of the polyurethane particulate according to Example 8 of the present invention. FIG. 3 shows SEM (scanning electron microscope) photograph of the polyurethane particulate according to Comparative Example 4. FIG. 4 shows an SEM (scanning electron microscope) photograph of the polyurethane particulate according to Comparative Example 5.

From the results, the polyurethane particulate prepared by the example of the present invention can be of uniform and regular spherical type. However, the polyurethane particulate prepared by the comparative examples were of a lumped state as indeterminate and amorphous types, and thus a troublesome procedure where the particles must be ground again must be undertaken.

In addition, although the results for the partial examples and comparatives examples are illustrated as FIGs., results obtained for Examples 14 to 20 were substantially the same as Example 13, and the result obtained for Comparative Example 7 was substantially the same for Comparative Examples 4 to 6, and there are not limiting.

Experimental Example

With regard to Examples 1 and 13 and Comparative Examples 1 and 4, the melting index was measured at 160° C., based on ASTM D-1238, and the shore hardness A was measured based on ASTM D-2240. The results are shown in Table 3.

TABLE 3

|  | Example 1 | Example 13 | Comparative Example 1 | Comparative Example 4 |
|---|---|---|---|---|
| Shore hardness A | 71 | 70 | 68 | 64 |
| Melting point (° C.) | 225 | 225 | 210 | 210 |
| Melting index | 63 | 61 | 66 | 65 |

As mentioned, the present invention can prepare a polyurethane particulate that is easy to control to a spherical form, that has a desired particle size, and that stably exhibits a color. In addition, the process of the present invention is simple, and therefore the preparation cost can be lowered.

In addition, the polyurethane particulate prepared by suspension polymerization according to the present invention may include thermoplastic and thermosetting polyurethane particulates. Thus, the thermoplastic polyurethane beads can exhibit effects of a high quality feeling of a material, a soft feeling, and a scratch-resistance property in a resin such as ABS or PP used in the interior of an automobile. Also, the thermosetting polyurethane particulate can be applied to additives of paints, ink, and the like, it has an increased scratch-resistance property of a coated surface, and it imparts elastic strength, because the particle interior has a three-dimensional network structure, and it has a solvent-resistance property to an organic solvent.

Although exemplary embodiments of the present invention have been described in detail hereinabove, it should be clearly understood that many variations and/or modifications of the basic inventive concept taught herein still fall within the spirit and scope of the present invention, as defined by the appended claims.

What is claimed is:

1. A process for preparing polyurethane particulates, consisting of:
   dispersing a compound having at least one isocyanate group and a compound having at least one active hydrogen in a dispersion medium comprising an inorganic suspension stabilizer to prepare a suspension solution; and
   heating the suspension solution to form polyurethane particulates, wherein the inorganic suspension stabilizer is one or more selected from the group consisting of barium sulfate, calcium sulfate, barium carbonate, silica, aluminum trioxide, aluminum hydroxide, tricalcium phosphate, magnesium hydroxide, titanium oxide, and calcium carbonate.

2. The process for preparing the polyurethane particulates of claim 1, wherein the inorganic suspension stabilizer is used at 0.5 to 20 parts by weight based on 100 parts by weight of the total composition of the compound having at least one isocyanate group and the compound having at least one active hydrogen.

3. The process for preparing the polyurethane particulates of claim 1, wherein the compound having at least one isocyanate group includes a di-functional compound and the compound having at least one active hydrogen includes di-functional compound.

4. The process for preparing the polyurethane particulates of claim 1, wherein at least one of the compound having at least one isocyanate group and the compound having at least one active hydrogen include a tri or more-functional compound.

5. The process for preparing the polyurethane particulates of claim 1, wherein the compound having at least one isocyanate group is selected from the group consisting of trilene diisocyanate, 4,4'-diphenyl methane diisocyanate, xylene diisocyanate, methaxylene diisocyanate, 1,6-hexamethylene diisocyanate, and isophorone diisocyanate; a polyisocyanate of tri or more-functional group; and a mixture thereof.

6. The process for preparing the polyurethane particulates of claim 5, wherein the compound having at least one isocyanate group has a molecular weight of 1000 to 3000.

7. The process for preparing the polyurethane particulates of claim 1, wherein the compound having at least one active hydrogen is one or more selected from the group consisting of a polyester-based polyol, a polyether-based polyol, and an acrylic polyol.

8. The process for preparing the polyurethane particulates of claim 1, wherein the dispersion medium further contains a pigment.

9. The process for preparing polyurethane particulates of claim 1, wherein the polyurethane particulates formed by the step of heating the suspension solution have an average particle size of 1-100 μm, shore hardness A of 70 to 75, a melting point of 200 to 230° C. and a melting index of 60 or more at 160° C.

10. The process for preparing polyurethane particulates of claim 1, wherein the heating is carried out at a temperature ranging from 40° C. to about 90° C.

* * * * *